(12) United States Patent
Gunugunuri et al.

(10) Patent No.: US 10,239,047 B1
(45) Date of Patent: Mar. 26, 2019

(54) DIRECT NOX DECOMPOSITION CATALYST WITH IMPROVED ACTIVITY AND SELECTIVITY

(71) Applicant: Toyota Motor Engineering & Manufacturing North America, Inc., Erlanger, KY (US)

(72) Inventors: Krishna Gunugunuri, Canton, MI (US); Charles Alexander Roberts, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/702,188

(22) Filed: Sep. 12, 2017

(51) Int. Cl.
| | |
|---|---|
| *B01J 23/78* | (2006.01) |
| *B01J 23/00* | (2006.01) |
| *B01J 35/00* | (2006.01) |
| *B01J 37/08* | (2006.01) |
| *B01J 37/02* | (2006.01) |
| *B01D 53/94* | (2006.01) |
| *F01N 3/10* | (2006.01) |

(52) U.S. Cl.
CPC .......... *B01J 23/78* (2013.01); *B01D 53/9413* (2013.01); *B01J 23/005* (2013.01); *B01J 35/0013* (2013.01); *B01J 37/0209* (2013.01); *B01J 37/0213* (2013.01); *B01J 37/08* (2013.01); *F01N 3/10* (2013.01); *B01D 2255/2022* (2013.01); *B01D 2255/20738* (2013.01); *B01D 2255/20746* (2013.01); *B01D 2255/405* (2013.01); *F01N 2570/14* (2013.01)

(58) Field of Classification Search
CPC .......... B01L 23/78; B01L 23/00; B01L 35/00; B01L 37/08; B01L 37/02; B01D 53/94; B01D 53/9409; B01D 53/9413; B01D 2255/20738; B01D 2255/20746; B01D 2255/405; B01D 2258/012; F01N 3/10; F01N 3/2066; F01N 2570/14; F01N 2570/1456; B01J 23/005; B01J 23/745; B01J 23/75; B01J 23/78
See application file for complete search history.

(56) References Cited

U.S. PATENT DOCUMENTS 9,162,216 B2 10/2015 Najbar et al.
2011/0110835 A9* 5/2011 Nirisen .............. B01D 53/8628
                                                                    423/237

OTHER PUBLICATIONS

Fino, D. et al., "Catalytic removal of NOx and diesel soot over nanostructured spinel-type oxides," Journal of Catalysis, 242, pp. 38-47 (2006).

(Continued)

*Primary Examiner* — Timothy C Vanoy
(74) *Attorney, Agent, or Firm* — Christopher G. Darrow; Darrow Mustafa PC

(57) ABSTRACT

A catalyst for direct decomposition of NO and $NO_2$ to $N_2$ and $O_2$ has a $CoFe_2O_4$ spinel doped with potassium cations. The catalyst has high activity and good selectivity for $N_2$ production, when potassium cations are loaded at a density of about 0.9 weight percent. Methods for making the catalyst include wet impregnation of a $CoFe_2O_4$ spinel with a solution of potassium cations, such as a KOH solution.

12 Claims, 5 Drawing Sheets

(56) References Cited

OTHER PUBLICATIONS

Haneda, M. et al., "Alkali metal-doped cobalt oxide catalysts for NO decomposition," Applied Catalysis B: Environmental, 46, pp. 473-482 (2003).

Park, P.W. et al., "NO decomposition over sodium-promoted cobalt oxide," Catalysis Today, 42, pp. 51-60 (1998).

Lendzion-Bielun, Z. et al., "Characterization of FeCo based catalyst for ammonia decomposition. The effect of potassium oxide," Polish Journal of Chemical Technology, vol. 16, No. 4, pp. 111-116 (2014).

Zasada, F. et al., "Potassium Promotion of Cobalt Spinel Catalyst for N2O Decomposition—Accounted by Work Function Measurements and DFT Modelling," Catal Lett, 127, pp. 126-131 (2009).

Sharma, R. et al., "Augmenting the catalytic activity of CoFe2O4 by substituting rare earth cations into the spinel structure," RSC Adv., 6, pp. 71676-71691 (2016).

Imanaka, N. et al., "Advances in direct NOx decomposition catalysts," Applied Catalysis A: General, 431-432, pp. 1-8 (2012).

Konsolakis, M., "Recent Advances on Nitrous Oxide (N2O) Decomposition over Non-Noble-Metal Oxide Catalysts: Catalytic Performance, Mechanistic Considerations, and Surface Chemistry Aspects," ACS Catal. 5, pp. 6397-6421 (2015).

\* cited by examiner

DIRECT NOX DECOMPOSITION CATALYST WITH IMPROVED ACTIVITY AND SELECTIVITY

TECHNICAL FIELD

The present disclosure generally relates to catalysts for conversion of undesired components in a combustion exhaust and, more particularly, to catalysts for the direct decomposition of $NO_x$.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Nitric oxide (NO) and nitrogen dioxide ($NO_2$) are noxious components of combustion exhaust streams. Many catalysts for abating NO and $NO_2$ (NO)) produce undesirable products, such as nitrous oxide ($N_2O$) or ammonia. Direct decomposition reactions, in which $NO_x$ is converted directly to $N_2$ and $O_2$ are known, but catalysts for direct decomposition frequently have low activity and/or selectivity, particularly at relevant temperatures in the low-to-mid hundreds of degrees Celsius.

Accordingly, it would be desirable to provide an improved catalyst for direct decomposition of $NO_x$, having high activity and selectivity.

SUMMARY

This section provides a general summary of the disclosure, and is not a comprehensive disclosure of its full scope or all of its features.

In various aspects, the present teachings provide a catalytic converter having a catalyst. The catalyst includes a $CoFe_2O_4$ spinel doped with potassium cations. In some implementations, the potassium cations are doped at a weight percentage within a range of from about 0.85 to 0.95%

In other aspects, the present teachings provide a method for direct decomposition removal of $NO_x$ from a gas mixture. The method includes a step of exposing a gas mixture having $NO_x$ to a catalyst including a $CoFe_2O_4$ spinel doped with potassium cations at a loading density within a range of from about 0.5 to about 2.0 weight percent. The method also includes a step of catalyzing a direct decomposition of the $NO_x$ to generate $N_2$ without the presence of a reductant Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
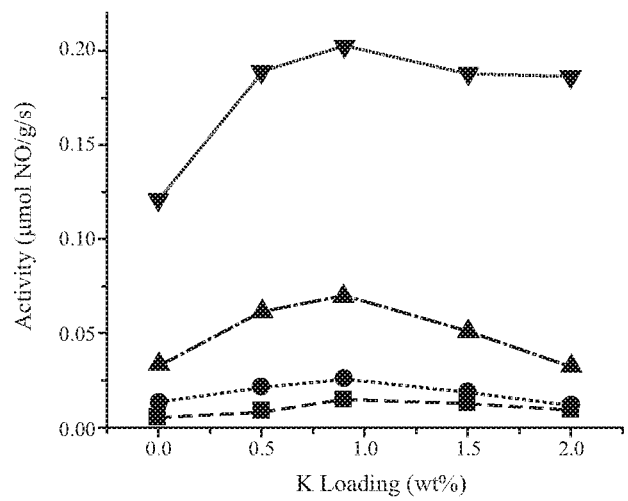
FIG. 1 is a plot of NO conversion rate as a function of temperature, for four reactions catalyzed by potassium-doped $CoFe_2O_4$ at four different potassium loading densities, including zero.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide a catalyst for direct decomposition of $NO_x$ in a combustion exhaust stream, catalytic converters having the catalyst, and methods for making the catalyst. The disclosed catalysts accelerate direct decomposition of $NO_x$, to $N_2$ and $O_2$ with appreciable catalytic activity, and very high selectivity. In one case, selectivity for $N_2$ product formation, as opposed to formation of $NH_3$ or other products of selective catalytic reduction (SCR), exceeds 95%.

The catalyst includes a $CoFe_2O_4$ doped with potassium, particularly at about 0.5-2.0%, by weight.

A catalyst composition is disclosed, having a central structure of spinel CoFe2O4, referred to alternatively as spinel cobalt ferrite. A unit cell of spinel cobalt ferrite is shown schematically in perspective view in FIG. X. The spinel cobalt ferrite is doped with potassium cations, $K^+$. The resulting catalyst is referred to alternatively as $K/CoFe_2O_4$ or potassium-doped spinel cobalt ferrite. In some implementations, potassium is present in the disclosed catalyst composition at a weight percentage within a range of 0.5 to 2.0%; or within a range of 0.5 to 1.5%; or within a range of 0.7 to 1.2%; or within a range of 0.85 to 0.95%, where the weight percentage of potassium is defined as:

$$\frac{\text{mass of potassium present in the catalyst}}{\text{total mass of the catalyst}} \times 100$$

Weight percentage of potassium in a catalyst will alternatively be referred to as "potassium loading density."

The disclosed catalyst has improved catalytic activity toward the direct decomposition of $NO_x$ to $N_2$ and $O_2$, where $NO_x$, is defined as any combination nitric oxide (NO) and ($NO_2$). Direct decomposition of $NO_x$ proceeds according to either or both of Reactions I and II:

$$2NO \rightarrow N_2 + O_2 \quad \text{(I), and}$$

$$2NO_2 \rightarrow N_2 + 2O_2 \quad \text{(II).}$$

Direct decomposition reactions are generally distinguishable from competing reactions by product formation. For example, incomplete decomposition reactions such as exemplary Reactions III and IV produce undesirable nitrous oxide rather than nitrogen gas:

$$4NO \rightarrow 2N_2O + O_2 \quad \text{(III), and}$$

$$4NO_2 \rightarrow 2N_2O + 3O_2 \quad \text{(IV).}$$

Similarly, various selective catalytic reduction (SCR) reactions can occur in the presence of a gaseous reducing agent, such as ammonia or alkane, and produce water, or water and carbon dioxide, rather than oxygen gas, as exemplified in Reactions V through VIII:

$$4NO + 4NH_3 + O_2 \rightarrow 4N_2 + 6H_2O \quad \text{(V),}$$

$$2NO_2 + 4NH_3 + O_2 \rightarrow 3N_2 + 6H_2O \quad \text{(VI),}$$

$$NO + CH_4 + O_2 \rightarrow N_2 + CO_2 + 2H_2O \quad \text{(VII), and}$$

$$2NO_2 + 2CH_4 + 2O_2 \rightarrow N_2 + 2CO_2 + 2H_2O \quad \text{(VIII).}$$

When oxygen is present, $NO_x$ may also be oxidized, such as shown in Reaction IX:

$$2NO + O_2 \rightarrow 2NO_2 \quad \text{(IX).}$$

Under controlled reaction conditions where catalyst is exposed to a gas flow containing nitric oxide, any or all of Reactions I and IV can occur primarily, but Reaction IX can also occur secondarily as $O_2$ is produced by reactions I and IV. A combined reaction is shown in Reaction X:

$$(4a + 4c - 2b)NO \rightarrow aN_2 + bO_2 + cN_2O + (2a - 2b + c)NO_2 \quad \text{(X)}$$

A nitrogen product selectivity ($N_2$ selectivity) can be defined for such a combined Reaction X according to Equation 1:

$$N_2 \text{ selectivity}(\%) = \frac{2[N_2]}{2[N_2] + 0.5[N_2O] + [NO_2]} \quad \text{Eq. 1}$$

FIG. 1 is a plot of total NO abatement, without regard to product specificity, as a function of potassium loading density at 450° C. (squares), 500° C. (circles), 550° C. (upward pointing triangles), and 650° C. (downward pointing triangles). The results shown in FIG. 1 indicate that the presence of doped potassium results in an increase in catalytic activity, with a maximum at about 0.9% potassium. At the lower temperatures of 450° C. to 550° C., the activity increase disappears at the highest loading density of 2% potassium, whereas at 650° C., most of the activity increase observed upon potassium loading up to 0.9% is retained at the highest loading density. At all temperatures, 0.9 wt % potassium loading density provides the highest direct $NO_x$ decomposition activity The $NO_x$ activity profiles of the $CoFe_2O_4$ and various $K/CoFe_2O_4$ catalysts as a function of K loading are presented in FIG. 1. As shown in the FIG. 1, the NOx decomposition activity increases with increasing temperature from 450° C. to 650° C. as expected. The addition of K to the $CoFe_2O_4$ spinel improves the direct $NO_x$ decomposition activity. The activity increases with increasing potassium loading up to 0.9 wt % and however, exceeding this loading leads to a decrease in the activity.

Figure 2:
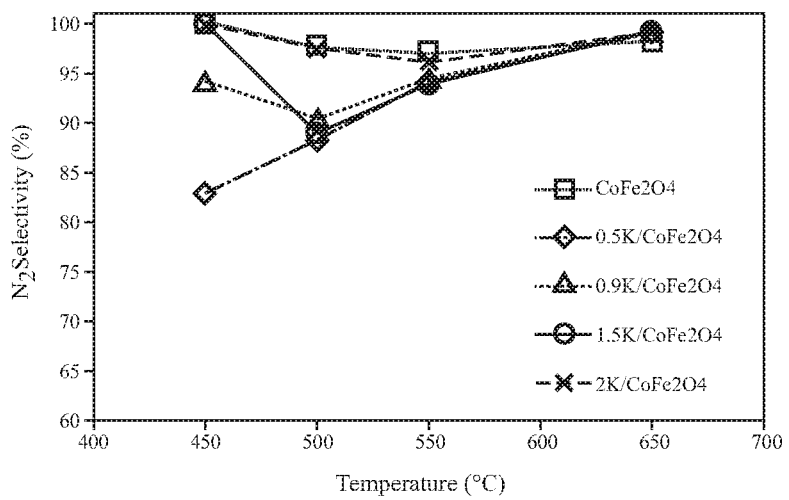
FIG. 2 is a plot of $N_2$ selectivity as a function of temperature, for five reactions catalyzed by potassium-doped $CoFe_2O_4$ at five different potassium loading densities, including zero.

FIG. 2 is a plot of $N_2$ selectivity, as defined by Equation 1, for four Example catalysts and one Comparative Example. The Comparative Example is spinel $CoFe_2O_4$ with no potassium doped. The four Examples are spinel $CoFe_2O_4$ with potassium doped at 0.5%, 0.9%, 1.5%, and 2.0%, and are referred to alternatively as $0.5K/CoFe_2O_4$, $0.9K/CoFe_2O_4$, $1.5K/CoFe_2O_4$, and $2K/CoFe_2O_4$, respectively. The results show that potassium doping generally results in a loss of $N_2$ selectivity, the loss of $N_2$ selectivity ranging from negligible to significant, depending on reaction temperature and potassium loading density. $N_2$ selectivity can generally be regarded as a measure of the extent to which the catalyst catalyzes direct decomposition Reactions I and II, rather than catalyzing undesirable reactions such as Reactions III, IV, or X.

To confirm that direct $NO_x$ decomposition to $N_2$ is taking place, rather than production of undesirable side products such as $N_2O$ or $NO_2$, the $N_2$ selectivity is measured according to Equation 1. The $N_2$ selectivity profiles for the $CoFe_2O_4$ and $K/CoFe_2O_4$ spinels are shown in FIG. 2. Interestingly, $CoFe_2O_4$ and $K/CoFe_2O_4$ catalysts exhibit more than 80% selectivity at all the temperatures investigated.

Figure 3:
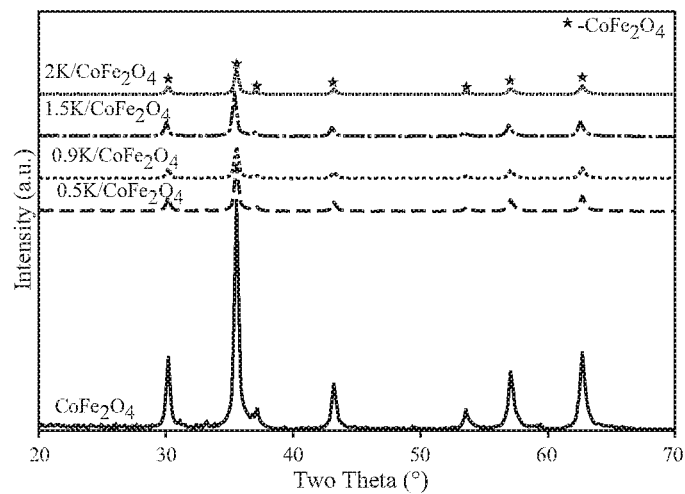
FIG. 3 is a plot of X-ray diffraction (XRD) spectra of the five catalysts of FIG. 2, after having been subjected to a calcination step of the present disclosure.

Structural and surface characterization measurements are performed over $CoFe_2O_4$ and $K/CoFe_2O_4$ spinels to understand the influence of potassium doping on the $CoFe_2O_4$ spinel. X-ray powder diffraction (XRD) measurements of $CoFe_2O_4$ and $K/CoFe_2O_4$ spinels after the calcination are shown in FIG. 3. The Comparative Example and all Example catalysts are calcined after doping (see Examples, below). The calcined $CoFe_2O_4$ Comparative Example exhibits reflections at 30.12, 35.73, 37.18, 43.18, 53.56, 57.02, 62.72 degrees. These 2θ values correspond to reflections of (220), (311), (222), (400), (422), (511) (440) planes, and are indicative of an inverse spinel with at least some $Co^{2+}$ cations occupying octahedral voids and some $Fe^{3+}$ occupying tetrahedral voids, consistent with JCPDS card no: 22-1086. No reflections due to either $Fe_2O_3$ or $Co_3O_4$ are observed. As shown in FIG. 3, all the potassium doped $CoFe_2O_4$ spinels exhibit XRD patterns similar to that of $CoFe_2O_4$. No additional peaks due to potassium or any compound consisting of K and $CoFe_2O_4$ are observed. These results suggest that K is highly dispersed over the surface of $CoFe_2O_4$.

Figure 4:
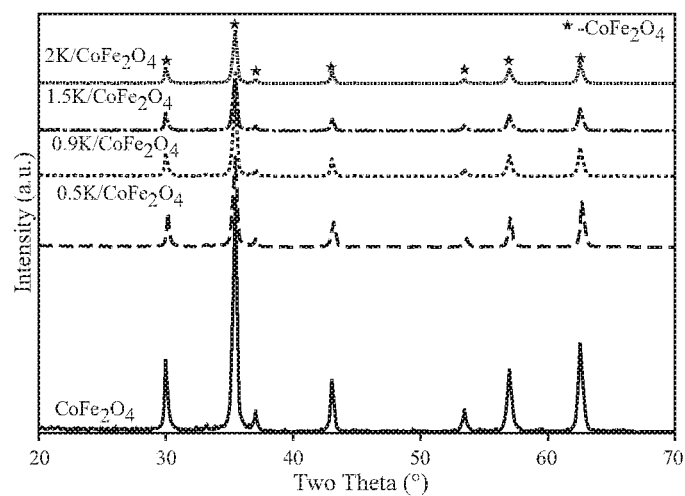
FIG. 4 is a plot of XRD spectra of the five catalysts of FIG. 2, after catalysis of the reaction of FIGS. 1 and 2.

The XRD patterns of the Comparative Example and Example catalysts after exposure to the NO reactant gas stream—i.e. after having catalyzed direct decomposition of NO—are shown in FIG. 4. As in FIG. 3, the Comparative Example and Example catalysts exhibit only reflections due to $CoFe_2O_4$; no reflections are observed due to $Fe_2O_3$ for any of the samples. These demonstrate that the structure of potassium doped $CoFe_2O_4$ catalysts is very stable during direct NOx decomposition catalysis.

Micro-Raman spectroscopy is a powerful and sensitive tool for characterization of thin films and powders. This technique is useful in understanding the microstructure of the materials down to nano-size domain. Ferrites, $MFe_2O_4$ where M is typically a divalent metal, crystallize in cubic structures belonging to the space group Fd3m (Oh7 No. 227). One complete unit cell contains 56 atoms and the smallest Brava is a cell consisting of only 14 atoms. Factor group analysis predicts phonon modes A1g(R), Eg(R), T1g, 3T2g(R), 2A2u, 2Eu, 4T1u(IR) and 2T2u for the spinel structure. Of the predicted phonon modes, five—A1g, Eg, and the 3 T2g modes—are Raman active. The remaining modes are only infrared and/or Hyper-Raman active. Cation redistribution in the tetrahedral and octahedral sites alter the symmetry of the crystal structure into I41/amd space group with a greater number of active vibrational modes in the Raman spectrum.

Figure 5:
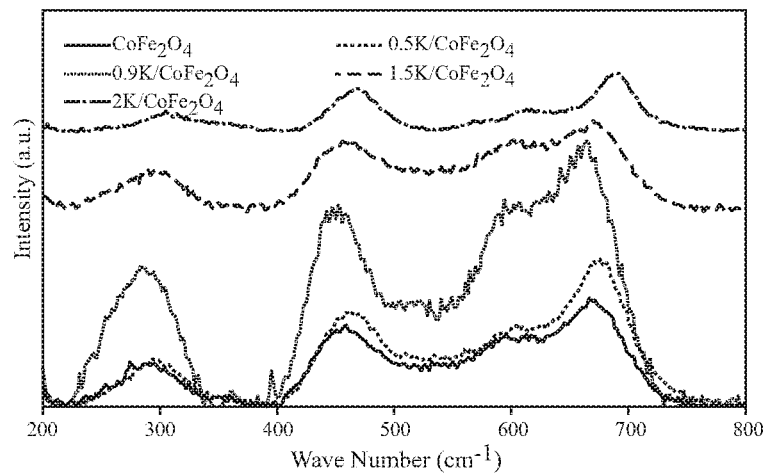
FIG. 5 is a plot of Raman diffraction spectra of the five catalysts of FIG. 2, after having been subjected to a calcination step of the present disclosure.

The Raman spectra of $CoFe_2O_4$ and $K/CoFe_2O_4$ spinels are shown in FIG. 5. The spectrum of $CoFe_2O_4$ exhibits six peak maxima at 210, 312, 470, 575, 624 and 695 $cm^{-1}$. Wavenumbers above 600 $cm^{-1}$, i.e., peak maxima at 624 and 695 $cm^{-1}$ are due to A1g symmetry involving symmetric stretching of the oxygen atom with respect to a metal ion in a tetrahedral void, i.e. the tetrahedral breathing mode (TBM). The other low frequency phonon modes are due to a metal ion involved in an octahedral void (BO6), i.e., Eg and T2g(3). These modes correspond to the symmetric and anti-symmetric bending of the oxygen atom in an M-O bond (i.e. a Co-O bond) at octahedral voids. All the K promoted $CoFe_2O_4$ also exhibit 6 peaks in the Raman spectra at 210, 312, 470, 575, 624, and 695 $cm^{-1}$. There are no observable new peaks resulting from potassium doping. Thus, the Raman spectroscopic measurements are consistent with the XRD results and support the view that potassium is homogeneously, and relatively sparsely, dispersed over the surface of $CoFe_2O_4$.

Figure 6:
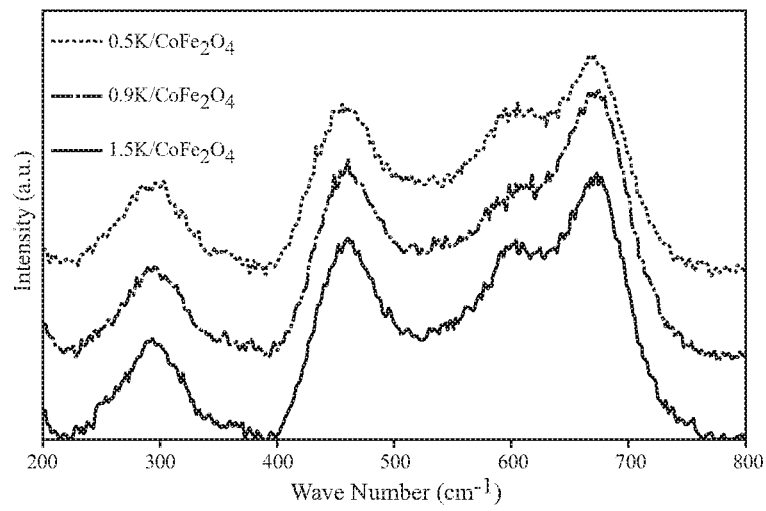
FIG. 6 is a plot of Raman diffraction spectra of three potassium-doped $CoFe_2O_4$ having 3 different potassium loading densities, after catalysis of the reaction of FIGS. 1 and 2.

Raman spectra of post-reaction samples, after direct $NO_x$ decomposition, are shown in FIG. 6. As with the pre-reaction spectra of FIG. 5, the post-reaction spectra of FIG. 6 exhibit only peaks due to the $CoFe_2O_4$ in all cases. This results supports the conclusion from XRD data, above, that the spinels are structurally and compositionally stable during direct NOx decomposition catalysis.

Figure 7:
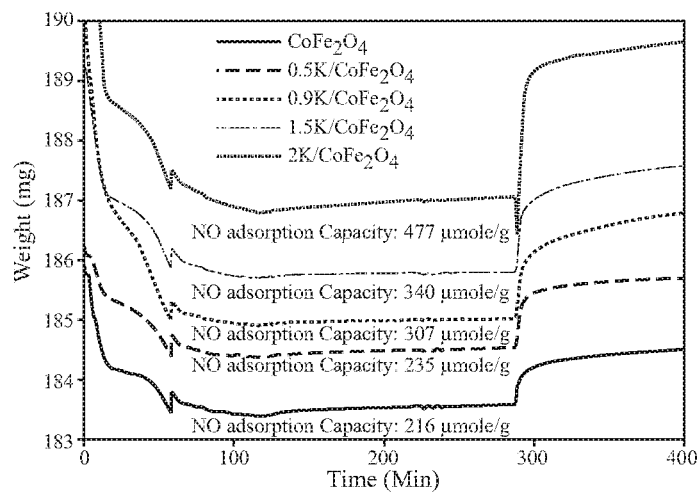
FIG. 7 is a plot of Thermogravimetric analysis profiles of the five catalysts of FIG. 2 during NO adsorption, showing NO adsorption capacity.

NO adsorption capacities of $CoFe_2O_4$ and the various $K/CoFe_2O_4$ catalysts are measured using Thermo-gravimetric analysis (TGA). Before the measurement, all the samples are pretreated to 600° C. in the presence of 20% $O_2$ to displace adsorbed $CO_2$. Then the temperature is reduced to 100° C. and a flow of 2% NO in helium is passed over the catalyst for several hours. The NO capacity is calculated by measuring the weight before and after the adsorption. The TGA profiles are shown in FIG. 7. Calculated NO adsorption capacity values are shown in the inset to FIG. 7. As expected the NO adsorption capacity increased with increasing potassium loading. The Comparative Example, $CoFe_2O_4$, exhibited an NO adsorption capacity of 216 mole/g. This value increased uniformly with increasing potassium loading, to a maximum of 477 μmole/g with 2 wt % potassium doping. Given that intermediate potassium loading densities provide greater catalytic activity than does 2% potassium loading, this result indicates that potassium doping produces effects other than NO adsorption capacity that influence increased catalytic activity.

Figure 8:
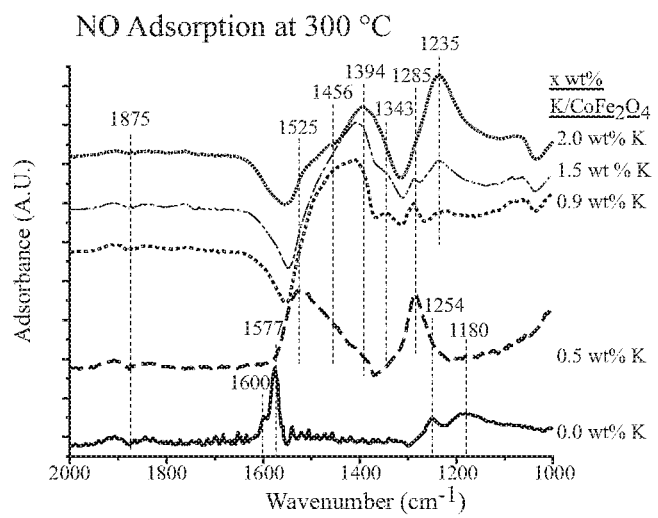
FIG. 8 is a plot of in situ Fourier Transform Infrared (FT-IR) spectra of the five catalysts of FIG. 2 during NO adsorption at 300° C.

The $NO_x$ adsorption properties of $CoFe_2O_4$ and $K/CoFe_2O_4$ catalysts are studied using in situ FT-IR (Fourier Transform Infrared) spectroscopy, measured during NO adsorption. The in situ FT-IR spectra of $CoFe_2O_4$ and $K/CoFe_2O_4$ catalysts during $NO_x$ adsorption at 300° C. are shown in FIG. 8. As shown in FIG. 8, $CoFe_2O_4$ exhibits adsorbed NO peaks at 1600, 1577, 1254 and 1180 $cm^{-1}$. The peaks at 1600, and 1180 $cm^{-1}$ are believed to be due to the bridging bidentate nitrato, and the peaks at 1577 and 1254 $cm^{-1}$ are due to the chelating bidentate nitrato intermediates.

As further shown in FIG. 8, the in-situ FT-IR NO adsorption spectrum of is substantially different from that of the $CoFe_2O_4$ Comparative Example. For the 0.5K/$CoFe_2O_4$ Example catalyst, the peaks at 1600, and 1180 $cm^{-1}$; and at 1577 and 1254 $cm^{-1}$; attributed to bridging and chelating and bridging nitrato, respectively, are not present. Instead, new peaks are evident at 1525, 1285 and 1030 $cm^{-1}$. These peaks correspond to the v1 (NO3-) and v3 (NO3-) stretching vibrations of the mono dentate nitrate intermediates. These measurements indicate that both the $CoFe_2O_4$ Comparative Example and the 0.5K/$CoFe_2O_4$ Example catalyst form nitrate intermediates, but that the mode of adsorption is different.

With further reference to FIG. 8, it is interesting to note that the in-situ FT-IR spectra of 0.9K/$CoFe_2O_4$ is also different from that of the $CoFe_2O_4$ Comparative Example and the 0.5K/$CoFe_2O_4$ Example catalyst. The peaks attributed to nitrate intermediates are not present, but new peaks at 1456, 1410, 1343, 1285 and 1235 $cm^{-1}$ are observed. The peaks at 1456 and 1285 $cm^{-1}$ are due to chelating nitro-nitro intermediates, and the peaks at 1394 and 1343 $cm^{-1}$ are due to the nitro intermediates. Interestingly, the intensity of the peaks at 1283 and 1343 $cm^{-1}$ decreases and the intensity of the peak at 1235 $cm^{-1}$ increases with increasing potassium loading. Also the peak at 1410 $cm^{-1}$ appears shifted to a lower wavenumber, while a new, broad peak between 1500 and 1550 cm-1 is observed for the 2 wt % K/$CoFe_2O_4$ catalyst. These results show, not only that potassium doping has a significant impact on the NO adsorption species that are present on the disclosed catalyst, but that the mode of adsorption changes with changing potassium loading density.

Figure 9:
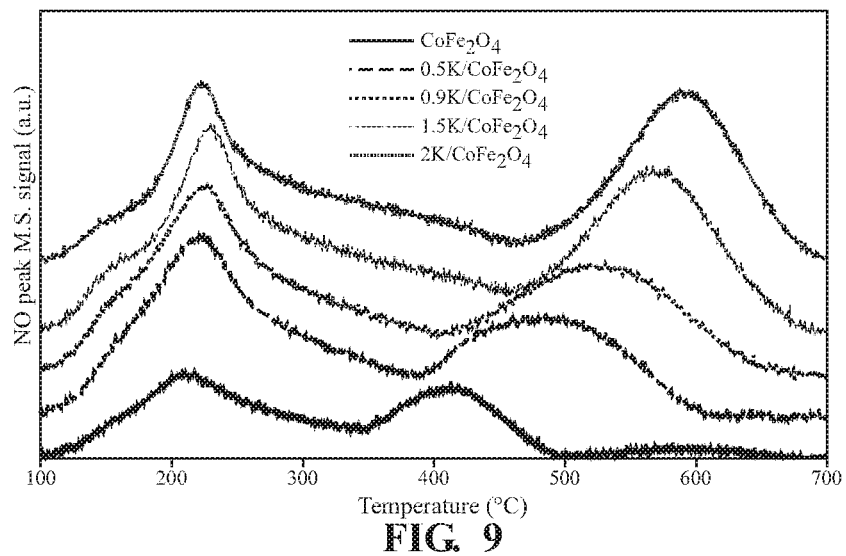
FIG. 9 is a plot of TPD of $O_2$ for the five catalysts of FIG. 2, showing detected $O_2$ mass spectrometry signal detection as a function of temperature during a controlled temperature increase across a temperature range from 100 to 700° C.
Figure 10:
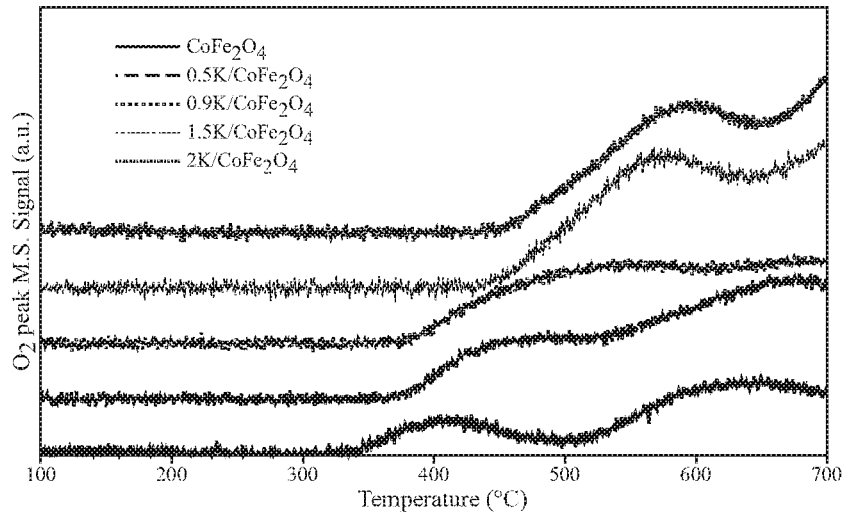
FIG. 10 is a plot of Temperature Programmed Desorption of NO for the five catalysts of FIG. 2, showing detected NO mass spectrometry signal detection as a function of temperature during a controlled temperature increase across a temperature range from 100 to 700° C.

As shown in FIGS. 9 and 10, the $NO_x$ desorption properties of the $CoFe_2O_4$ and $K/CoFe_2O_4$ catalysts are studied using NO temperature programmed desorption (NO-TPD). In a typical NO-TPD experiment, $NO_x$ is first adsorbed at 100° C. and then the temperature is ramped from 100 to 700° C. in an inert gas to desorb the products. The desorbed products are then identified and measured by mass spectrometry. During the desorption, NO decomposes and desorbs the products of $N_2$, $O_2$, $N_2O$ and $NO_2$ or NO can desorb itself without decomposition. The NO, and $O_2$, desorption temperature profiles over the $CoFe_2O_4$ and $K/CoFe_2O_4$ catalysts are presented in FIGS. 9 and 10. As shown in FIG. 9, $CoFe_2O_4$ exhibits two peaks in the NO desorption profile. The peak in the temperature region 100-300° C. is attributed to physisorbed NO, adsorbed to the catalyst primarily by van der Waals forces, while the peak in the temperature region 350° C.-500° C. is attributed to chemisorbed NO, adsorbed to the catalyst primarily by covalent, dative covalent, and/or ionic bonds.

With further reference to FIG. 9, all the potassium doped Example catalysts also exhibit two peaks in the NO desorption profile. While there is no shift in the physisorbed NO peak resulting from increasing potassium loading, the chemisorbed NO peak shifts to higher temperature with increasing potassium loading. These results indicate that potassium helps the catalyst to bind strongly with NO, with an increase in chemical bond strength between the NO and catalyst with increasing potassium loading density.

The $O_2$ desorption profiles of the $CoFe_2O_4$ Comparative Example and $K/CoFe_2O_4$ Example catalysts during NO-TPD are shown in FIG. 10. As shown in FIG. 10, $CoFe_2O_4$ begins to release chemisorbed oxygen at about 350° C., and to release bulk oxygen at about 500° C. Both chemisorbed and bulk oxygen peaks shifted to slightly higher temperature with the addition of 0.5 weight % potassium. Somewhat surprisingly, $0.9K/CoFe_2O_4$ releases both chemisorbed and bulk oxygen simultaneously, beginning at about 375° C. There is a very large shift in the chemisorbed and bulk oxygen desorption peaks with increasing potassium loading, with $1.5K/CoFe_2O_4$ retaining chemisorbed oxygen up to 450° C. (100° C. higher than the $CoFe_2O_4$) and retaining bulk oxygen up to 650° C. (150° C. higher than the $CoFe_2O_4$). These peaks further shifted to slightly higher temperature with increasing potassium loading from 1.5 to 2 wt %.

This result suggests that potassium doping increases bond strength between the catalyst and $O_2$ product, and that bond strength between the catalyst and $O_2$ product continues to increase with increasing potassium loading density. It will be understood that increased binding affinity for product ($O_2$) will tend to diminish catalyst turnover, thereby decreasing catalytic activity. It may therefore be reasonably surmised, without being bound by any particular theory, that obtaining the highest activity catalyst requires achieving a balance between the increased reactant ($NO_x$) binding and the increased product ($O_2$) binding that result from increasing potassium loading density. Based on the results presented herein, it appears that this balance is achieved at a loading density of about 0.9 weight percent.

The catalyst systems of the present disclosure can be used in a chamber or an enclosure, such as a catalytic converter, having an inlet and an outlet. As is commonly known to those of ordinary skill in the art, such a chamber or enclosure can be configured to receive an exhaust gas stream through the inlet and to exit the exhaust gas stream through the outlet, such that the exhaust gas stream has a particular or defined flow direction.

Also disclosed is a method for making a catalyst. The method includes a step of doping a $CoFe_2O_4$ spinel with potassium cations. The doping step can be performed by wet impregnation, in which the $CoFe_2O_4$ spinel is contacted with a solution containing potassium cations. In some implementations, the solution containing potassium cations will be a potassium hydroxide solution. The method for making a catalyst can also include a step of calcining the $CoFe_2O_4$ spinel. The method for making a catalyst can also include a step of calcining the potassium doped $CoFe_2O_4$ spinel. In different implementations, the step of doping the spinel with potassium cations can include doping the spinel with potassium cations to within a range of 0.5 to 2.0 weight %; or within a range of 0.5 to 1.5 weight %; or within a range of 0.7 to 1.2 weight %; or within a range of 0.85 to 0.95 weight %.

Also disclosed is a method for direct decomposition removal of $NO_x$ from a gas mixture, according to either of Reactions I and II. The method for direct decomposition removal of $NO_x$ from a gas mixture includes a step of exposing a gas mixture having $NO_x$ to a catalyst including a $CoFe_2O_4$ spinel doped with potassium cations. The $CoFe_2O_4$ spinel doped with potassium cations used in the method is as described above. The method for direct decomposition removal of $NO_x$ from a gas mixture also includes a step of catalyzing a direct decomposition of the $NO_x$ to generate $N_2$ without the presence of a reductant. In some implementations, the step of exposing a gas mixture having $NO_x$ to a catalyst including a $CoFe_2O_4$ spinel doped with potassium cations can include passing the gas mixture having $NO_x$ over the catalyst at a temperature within a range of 450-650° C., or 450-550° C., or 550-650° C., or at a temperature greater than 650° C. In some implementations, the gas mixture can be an exhaust stream from an internal combustion engine.

The present invention is further illustrated with respect to the following examples. It needs to be understood that these examples are provided to illustrate specific embodiments of the present invention and should not be construed as limiting the scope of the present invention.

Example 1. Synthesis of Examples 1-4 and the Comparative Example $CoFe_2O_4$ is purchased from Sigma Aldrich and calcined at 400° C. for 1 hour. Examples 1-4 and the Comparative Example are synthesized by a wet impregnation synthesis procedure. In a wet impregnation, 5 g of $CoFe_2O_4$ are mixed with and suspended in 50 mL of water. A calculated quantity of potassium hydroxide, as shown below in Table 1, is dissolved separately in deionized water and combined with the $CoFe_2O_4$ suspension, and the mixture is heated to 80° C. with continuous stirring. The resulting powder is then dried in an oven at 120° C. for 12 hours under air. Finally, the catalyst is calcined at 400° C. for 1 hour in the presence of air after ramping up to 400° C. with a 1° C./min ramp.

TABLE 1

Composition of wet impregnation solutions

| | Mass $CoFe_2O_4$ | Mass KOH | Weight % Potassium in doped catalyst |
|---|---|---|---|
| Comparative Example | 5 grams | 0 mg | 0.0 |
| Example 1 | 5 grams | 36.06 mg | 0.5 |
| Example 2 | 5 grams | 65.16 mg | 0.9 |
| Example 3 | 5 grams | 108.2 mg | 1.5 |
| Example 4 | 5 grams | 146.4 mg | 2.0 |

Example 2. Characterization of Examples 1-4 and the Comparative Example

The phase composition of Examples 1-4 and the Comparative Example is measured using X-ray diffraction measurements. X-ray powder diffraction (XRD) measurements are performed using a Rigaku SmartLab X Ray Diffractometer. Spectra are collected over a 2θ range of 20-80 degrees at a rate of 0.5 degrees per minute with a step size of 0.02 degrees per step. Structural assignments are made using PDXL software. The phase composition of the materials is determined using the ICDD-PDF database.

Raman spectra of the samples are recorded using a HORIBA Lab Ram HR 800 spectrometer with a 532 nm Ar+ ion laser. Laser power is optimized to 0.5 milliwatts on the sample surface, after taking into consideration the (S/N) ratio and sample degradation. Raman spectra are acquired for 60 s using a 100× objective lens.

NO adsorption capacities of the $CoFe_2O_4$ and $K/CoFe_2O_4$ catalysts are measured using NETZSCH STA-449 thermogravimetric analyzer equipped with mass spectrometer. Before the experiment, the catalysts are preheated to 600° C. in the presence of 20% $O_2$/He. After the pretreatment, the temperature is decreased to 100° C. Then NO is adsorbed by passing 2% NO/He over the catalyst for 4 hours. The NO adsorption capacity is calculated by measuring the weight before and after NO adsorption.

The NO adsorption properties are measured using in situ Fourier transform infrared (FT-IR) spectroscopic measurements. The Harrick High Temperature Cell with environmental (gas flow) and temperature control is used for in situ diffuse-reflectance FT-IR spectroscopy. Spectra are recorded using a Thermo Scientific Nicolet 8700 Research FT-IR Spectrometer equipped with a liquid $N_2$ cooled MCT detector. Spectra are obtained with a resolution of 2 cm-1 and by averaging 64 scans. In situ diffuse-reflectance FT-IR spectra are collected during NO adsorption at 300° C. Prior to NO adsorption, the sample is first pretreated at 350° C. in 30 ml/min of 10% $O_2$/He. The background spectrum (64 scans) is of the catalyst after cooling to 300° C. in 30 ml/min of UHP He. Adsorption of NO is achieved by flowing 30 ml/min of 1% NO over the catalyst for 25 min. Adsorption of NO is allowed to proceed for 25 min while spectra are obtained every minute using a series collection. To compare peak intensities among different catalyst samples, the adsorption spectra are normalized to the NO gas phase peak at −1876 cm-1.

The NO desorption properties are measured using temperature programmed desorption of NO (NO-TPD) experiment. The NO-TPD experiments are performed using 3flex Surface Characterization Analyzer from Micromeritics equipped with mass spectrometer for gas phase analysis. Before the experiment, the catalysts are preheated to 300° C. in the presence of 20% $O_2$/He. After pretreatment the temperature is decreased to 100° C. and NO is adsorbed by passing 2% NO/He over the sample for 1 hour. Following NO adsorption, physisorbed gases are removed by passing helium for 1 hour. NO desorption properties are measured by ramping the temperature from 100° C. to 700° C. in the presence of helium. The desorbed gases (NO, $N_2$, $O_2$, $N_2O$ and $NO_2$) are monitored by using an MKS Cirrus-2 mass spectrometer.

The direct $NO_x$ decomposition measurements are performed in a fixed bed flow reactor following Scheme 1. The direct $NO_x$ decomposition measurements are performed using ~1% $NO_x$ balance helium with a gas hourly space velocity of 2,100 h-1 and in the temperature region of 450° C.-650° C. Before the reaction, catalysts are pretreated at 500° C. in the presence of 20% $O_2$/He. After the pretreatment, the bed temperature is decreased to 450° C. and direct $NO_x$ decomposition measurements are collected.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalytic converter for the direct decomposition removal of $NO_x$ from an exhaust gas stream flowing at a temperature of from about 400° C. to about 650° C., the catalytic converter comprising:
   an inlet configured to receive the exhaust gas stream into an enclosure;
   an outlet configured to allow the exhaust gas stream to exit the enclosure; and
   a catalyst system contained inside the enclosure, the catalyst system comprising $CoFe_2O_4$ spinel in a nanoparticle form, having an average diameter of from about 2 nm to about 100 nm; and
   potassium cations doped in the spinel.

2. The catalytic converter as recited in claim 1, wherein the potassium cations are present at a weight percentage within a range of from about 0.5 to about 2.0%.

3. The catalytic converter as recited in claim 1, wherein the potassium cations are present at a weight percentage within a range of from about 0.5 to about 1.5%.

4. The catalytic converter as recited in claim 1, wherein the potassium cations are present at a weight percentage within a range of from about 0.7 to about 1.2%.

5. The catalytic converter as recited in claim 1, wherein the potassium cations are present at a weight percentage within a range of from about 0.85 to about 0.95%.

6. A method for direct decomposition removal of $NO_x$ from a gas mixture, the method comprising:
   exposing a gas mixture having $NO_x$ to a catalyst including a $CoFe_2O_4$ spinel doped with potassium cations at a loading density within a range of from about 0.5 to about 2.0 weight percent; and catalyzing a direct decomposition of the $NO_x$ to generate $N_2$ without the presence of a reductant.

7. The method as recited in claim 6, wherein the step of exposing the gas mixture to the catalyst can include passing the gas mixture having $NO_x$ over the catalyst at a temperature within a range of 450-650° C.

8. The method as recited in claim 7, wherein the gas mixture is an exhaust stream from an internal combustion engine.

9. The method as recited in claim 6, wherein the potassium cations are present at a weight percentage within a range of from about 0.5 to about 2.0%.

10. The method as recited in claim 6, wherein
the potassium cations are present at a weight percentage within a range of from about 0.5 to about 1.5%.

11. The method as recited in claim 6, wherein
the potassium cations are present at a weight percentage within a range of from about 0.7 to about 1.2%.

12. The method as recited in claim 6, wherein the potassium cations are present at a weight percentage within a range of from about 0.85 to about 0.95%.

* * * * *